J. J. P. WALSH.
TIRE.
APPLICATION FILED JUNE 2, 1920.

1,423,549.

Patented July 25, 1922.
2 SHEETS—SHEET 1.

Inventor
John J. P. Walsh
By his Attorney

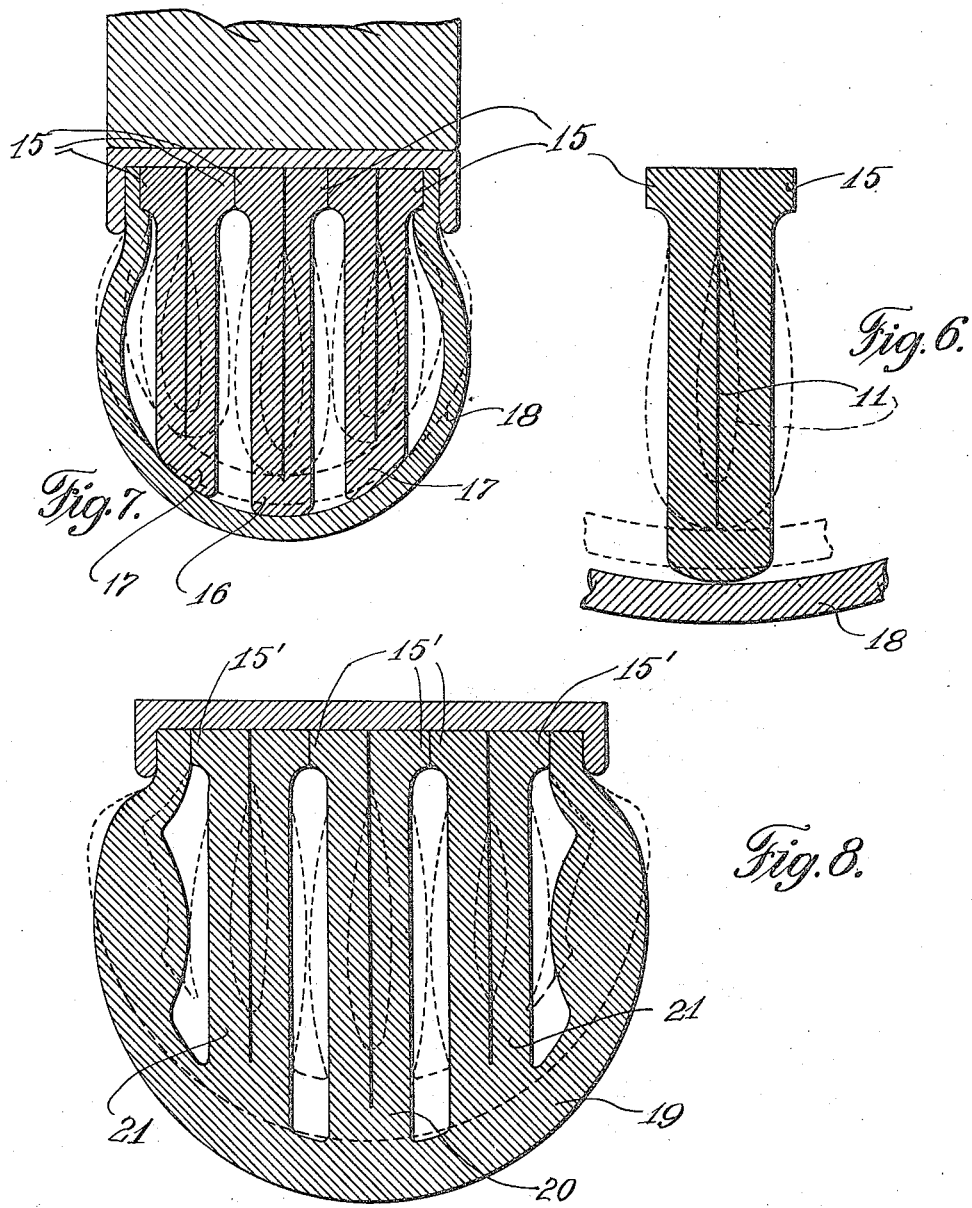

UNITED STATES PATENT OFFICE.

JOHN J. P. WALSH, OF NEW YORK, N. Y.

TIRE.

1,423,549.  Specification of Letters Patent.  Patented July 25, 1922.

Application filed June 2, 1920. Serial No. 385,923.

*To all whom it may concern:*

Be it known that I, JOHN J. P. WALSH, a citizen of the United States, and resident of New York, in the county of New York and State of New York, have invented a certain new and useful Improvement in Tires, of which the following is a specification.

This invention relates broadly to a method of producing a vehicle tire and the product obtained thereby.

The principal objects of this invention are the method of producing and the resulting product of a vehicle tire and the like having the qualities of a pneumatic tire without the disadvantages thereof.

Another object of my invention is the method of producing laminated tires, each of the laminæ of which forming an individual resilient unit of its own.

A further object is the method of producing such individual units, which comprises forming an annular slot within a resilient flat ring thereby partially dividing or splitting it to form, so to speak, a double member held together at its outer circumference and adapted to spread or give when subjected to pressure.

Still another object of my invention is the process of arranging such units to form a tire and adapted to serve, either enveloped by a cover, or uncovered, for the purpose described.

Another object of my invention is to provide a vehicle tire composed of units produced by my method, adapted to absorb pressure either individually or in whole, and arranged for proper traction when in use and without being subjected to undue wear.

The foregoing and other objects will be more clearly understood from the following description and the accompanying drawings, forming part of this specification, in which:—

Figure 6 represents a cross section of a modified form of a unit.

Figure 7 represents a cross section of a tire made of such modified units enveloped by a resilient covering.

Figure 8 represents a cross section of a tire made basically on the same principle, but in a modified form.

Figure 1:
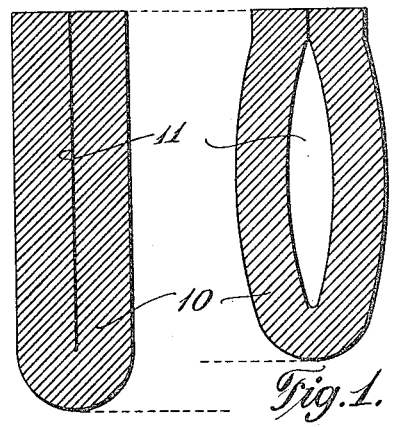
Figure 1 represents typical cross sections of an individual unit in normal and compressed position.

Heretofore in the art it has been the custom to employ either pneumatic, solid, semi-pneumatic or spring tires of different shapes and constructions meeting in practice with more or less success. The underlying principle of absorbing shocks of the road has been solved as nearly as possible only by pneumatic tires.

The present invention is intended to take the place of pneumatic tires especially when applied as shoes for heavy duty vehicles.

My invention is based upon entirely different ideas from any one heretofore employed and it involves the process or method of fabricating units adapted to fulfill the new principle involved.

Generally speaking, when a flat, washer-like ring is subjected to pressure it will be found that it will resist considerably any attempt of compressing it, even though it may be made of resilient material.

When combining two such rings, and holding them firmly together at their inner and outer circumference the rings will give, their sides bending or bulging outwards.

Similar results may be obtained by splitting or slotting a solid ring in such a way as to form a double unit.

In the drawings, 10 designates a solid resilient flat ring, which was split at 11 and is normally held together, keeping its original shape. When pressure is applied the sides bulge out symmetrically, to the ring's center plane, the slotted portion is correspondingly widened and the height or the diameter of the ring is reduced.

The slot 11 may be produced in many different ways.

The ring is preferably made of resilient material. The solid ring is then provided with a concentrical cut, the outer diameter of which is smaller than the outer diameter of the ring.

It is also possible to mold the ring with a slot therein.

Figure 5:
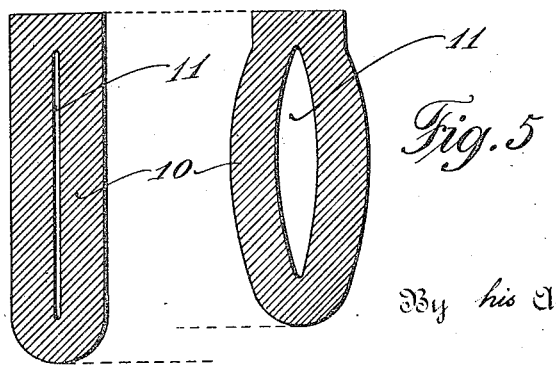
Figure 5 is another typical cross section of an individual unit.

Another way of accomplishing the desired results is to provide, when molding the ring, a circular core within the ring material, so as to form a closed annular slot as indicated in Figure 5. Such core, while preventing the ring walls from adhering to each other, must not impair the working of the ring in any way. The core material used is preferably a composition of paper or the like which crumbles to powder after having served as core for separating the walls.

Figure 2:
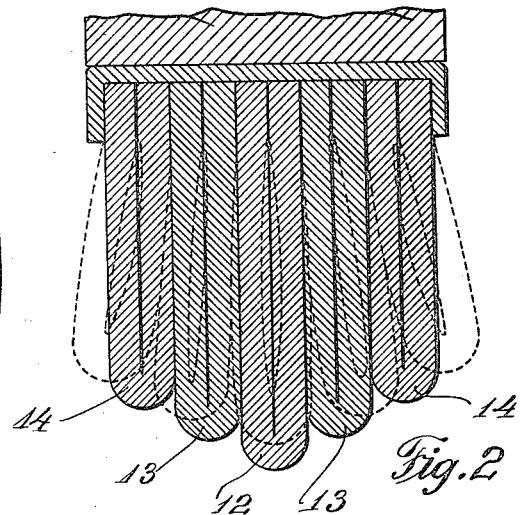
Figure 2 is a cross section of an uncovered tire composed of such units.
Figure 3:
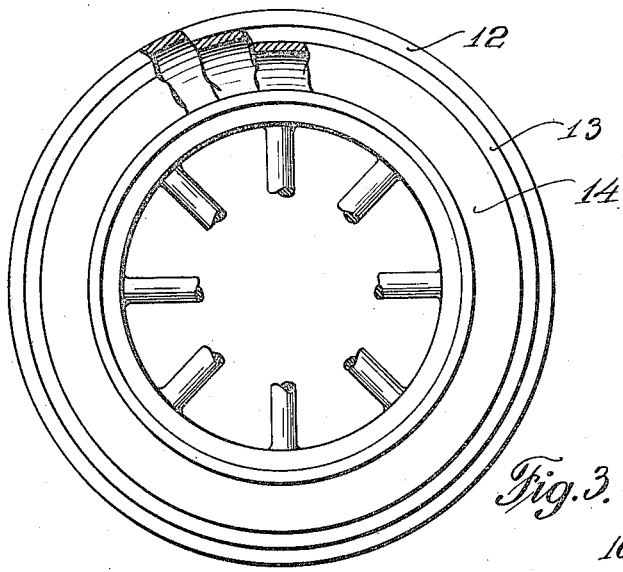
Figure 3 represents a vehicle wheel with such tire mounted thereon.
Figure 4:
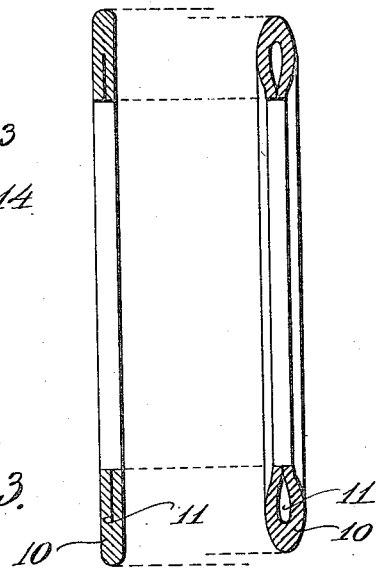
Figure 4 is a cross section of the tire unit of largest diameter in normal and compressed state.

In order to produce a practicable tire from units made by the method indicated, a plurality of rings is pressed or otherwise held together at or near the inner circumference of the rings, thus permitting the free outer edges thereof to spread when pressure is applied, as indicated in Figure 2 in dashed lines.

As may be seen the tire is composed of a plurality of split or slotted rings of various diameters so arranged that the ring 12 of largest diameter forms the center part of the tire, and rings 13 and 14 of smaller diameters the sides, the diameters decreasing proportionally with the distance from the center plane of the tire.

It will be observed that when such composite tire is subjected to pressure the outer rings will shape themselves corresponding to the form of the compressed inner ring, and the rings will always adhere to each other at their faces.

A tire produced by my improved method of arranging rings, provided with annular slots, adjacent to each other in the manner described proves in practice to possess not only the advantages of a pneumatic tire but surpass it as it facilitates absorbing shocks or pressure individually at each of its units.

While in Figure 2 a cross section of a tire is shown having the individual rings arranged with their entire faces closely held together and without a covering enveloping the rings, it is obvious that such a covering may be provided to enclose all or parts of the individual units.

Also the shape of the unit ring may be made in different ways, one form of which is shown in Figure 6, representing a typical section.

This type of a unit is provided with flanges 15 at the portion held in the rim of a wheel. In this way a play space is provided between the adjacent units facilitating their unobstructed spreading when pressure is applied.

In Figure 7 a cross section of a tire is shown composed of such flanged units 16 at the center, and 17 at the sides. Their flanged portions 15 are pressed together, and all three rings are covered by an envelope 18 of the general wheel shoe shape. The operation, principle and process of manufacturing of such tire is the same as that described above.

A still further modification is shown in Figure 8. The enveloping part 19 is made of one piece with the units 20 and 21, all of which units are provided with flanges 15'.

This type of construction has the advantage of being made in one piece.

It is obvious that any shape of units may be employed to form a complete tire, for instance the shape shown in Figure 5 may be adapted in tire sections shown in Figures 7 and 8.

I reserve for myself the right to make changes and improvements within the broad scope of the claims of my invention to meet various arising conditions.

Having described my method and the article produced thereby, I claim:

1. In a vehicle tire comprising in combination, a plurality of individual flat resilient rings of varying outer diameters and held together at their inner circumference, a normally closed annular slot formed in each of said rings, its inner diameter being equal to the inner diameters of the rings, their outer diameters being smaller than the outer diameters of their respective rings, said slots adapted to widen when pressure is applied.

2. In a vehicle tire composed of a plurality of individual flat units, a flat resilient ring, a central slot of lesser outer diameter than the outer diameter of the ring formed therein and dividing it into two normally adjacent annular flaps joined at their outer circumference, said flaps adapted to spread apart when pressure is applied.

3. In a vehicle tire, comprising in combination, a plurality of individual flat resilient rings of varying outer diameters unyieldingly held together at their inner circumference, a normally closed annular slot provided in each of said rings, the outer diameters of the slots being smaller than the outer diameters of their respective rings, annular spaces provided between the individual slotted rings adapted to facilitate the spreading of the rings and the opening of the slots when pressure is applied.

4. A vehicle tire, comprising in combination, a plurality of individual annularly slotted and normally flat rings of various outer diameters grouped so that the rings of larger diameters form the center and the rings of smaller diameters the sides of the tire, annular spaces provided between the normally flat rings and adapted to facilitate the spreading of the rings when subjected to pressure.

5. A vehicle tire, comprising in combination, a plurality of individual annularly slotted and normally flat rings of various outer and equal inner diameters held adjacent to each other at their inner circumference and being substantially free at their outer circumference, annular spaces provided between said rings for facilitating their changing of shapes when under pressure.

6. A vehicle tire, comprising in combination, a plurality of individual normally flat and annularly split units held firmly together at their inner circumference and substantially free from their point of union to and at their outer circumference, said units adapted to individually spread under pressure.

7. A vehicle tire having a plurality of individual flat and annularly slotted rings, said rings held firmly together at their inner circumference, spaces provided between the free outer portions of the rings, the slotted portions of said rings adapted to be normally closed and to spread apart and partially filling the said spaces when under pressure.

8. In a vehicle tire, a flat resilient ring having an annular normally closed central slot of lesser outer diameter than the outer diameter of the ring, said slot dividing the ring into a double ring and adapted to spread open under pressure.

9. A vehicle tire, comprising in combination, a plurality of flat rings provided with annular slots, the surfaces of the slotted ring portions being normally adjacent and adapted to spread when subjected to pressure, said rings held firmly together at their inner circumference and being substantially free from their points of union to and at their outer circumference, an annular outer envelope enclosing said rings, spaces provided between the rings and the side walls of the envelope for facilitating the spreading of said rings.

10. In a vehicle tire, which comprises in combination a plurality of disk-like flat rings partially divided at their center planes through annular slots of smaller diameters than the outer ring diameters, said rings held adjacent to each other and adapted to spread when subjected to pressure.

Signed at New York, in the county of New York and State of New York this 15th day of May, A. D. 1920.

JOHN J. P. WALSH.